United States Patent
Chadwick et al.

(10) Patent No.: US 9,520,876 B1
(45) Date of Patent: Dec. 13, 2016

(54) POWER GATING AND CLOCK GATING IN WIRING LEVELS

(71) Applicant: INTERNATIONAL BUSINESS MACHINES CORPORATION, Armonk, NY (US)

(72) Inventors: Nathaniel R. Chadwick, Lowell, MA (US); Tassbieh Hassan, Burke, VA (US); Kirk D. Peterson, Jericho, VT (US); John E. Sheets, II, Zumbrota, MN (US); Christine E. Whiteside, Charlotte, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/045,753

(22) Filed: Feb. 17, 2016

(51) Int. Cl.
| | |
|---|---|
| *H03K 19/00* | (2006.01) |
| *H03K 19/177* | (2006.01) |
| *H03K 3/037* | (2006.01) |
| *H03K 19/096* | (2006.01) |
| *H03K 19/0185* | (2006.01) |
| *H01L 25/065* | (2006.01) |

(Continued)

(52) U.S. Cl.
CPC ......... *H03K 19/0016* (2013.01); *G06F 17/505* (2013.01); *G06F 17/5063* (2013.01); *G06F 17/5072* (2013.01); *H01L 21/486* (2013.01); *H01L 22/32* (2013.01); *H01L 23/147* (2013.01); *H01L 23/522* (2013.01); *H01L 25/0652* (2013.01); *H01L 25/0657* (2013.01); *H03K 3/037* (2013.01); *H03K 19/018585* (2013.01); *H03K 19/096* (2013.01); *H03K 19/17728* (2013.01)

(58) Field of Classification Search
CPC .................. H01L 2224/16145; H01L 25/0657; H01L 25/18; H01L 25/50; H01L 27/016; H01L 23/50; H01L 23/5226; H01L 23/5286; Y10S 257/909; G06F 13/4291; G06F 17/505; G06F 2217/65; H03K 19/018585; H03K 19/17728; H03K 19/17796; H03K 19/096; H03K 23/40; H03K 23/58
See application file for complete search history.

(56) References Cited

U.S. PATENT DOCUMENTS

| | | | | |
|---|---|---|---|---|
| 6,765,245 B2 * | 7/2004 | Bansal | .............. | H01L 27/11807 257/202 |
| 6,998,866 B1 * | 2/2006 | Bazan | .............. | G01R 31/31855 324/73.1 |

(Continued)

*Primary Examiner* — Vibol Tan
(74) *Attorney, Agent, or Firm* — Robert J. Shatto; Robert Williams

(57) ABSTRACT

A semiconductor comprising a front end of line portion including a logical processing unit (LPU) and a second LPU. The first LPU configured to perform a first operation and the second LPU configured to perform a second operation following the first operation. A back end of line portion including a plurality of wiring levels, and further including a power gate and a clock gate that are integrated into one or more wiring levels of the plurality of wiring levels. The power gate and clock gate are further electrically connected to the first LPU by an enable wire. The power gate and clock gate are electrically connected to a power grid and a clock net, respectively, by the enable wire, and the enable wire is further electrically connected to a latch of the second LPU. A signal wire is electrically connected to the first LPU and to the latch.

19 Claims, 5 Drawing Sheets

(51) Int. Cl.
*H01L 21/48* (2006.01)
*H01L 23/14* (2006.01)
*H01L 21/66* (2006.01)
*H01L 23/522* (2006.01)
*G06F 17/50* (2006.01)

(56) References Cited

U.S. PATENT DOCUMENTS

| | | | |
|---|---|---|---|
| 7,863,960 B2 * | 1/2011 | Wang | H03L 7/099 |
| | | | 327/291 |
| 8,395,186 B2 | 3/2013 | Erickson et al. | |
| 8,405,226 B2 * | 3/2013 | Knickerbocker | H01L 21/486 |
| | | | 257/777 |
| 8,435,851 B2 | 5/2013 | Erickson et al. | |
| 8,575,613 B2 | 11/2013 | Erickson et al. | |
| 8,617,939 B2 | 12/2013 | Erickson et al. | |
| 8,729,975 B2 * | 5/2014 | Van Goor | G06F 17/5063 |
| | | | 331/167 |
| 8,735,975 B2 | 5/2014 | Erickson et al. | |
| 8,890,562 B1 * | 11/2014 | Hartanto | G01B 31/31851 |
| | | | 324/762.06 |
| 9,110,136 B2 * | 8/2015 | Goel | G01R 31/3177 |
| 9,404,971 B2 * | 8/2016 | Goel | G01R 31/3177 |
| 9,412,682 B2 * | 8/2016 | Barowski | H01L 23/481 |
| 2015/0014814 A1 | 1/2015 | Booth, Jr. et al. | |
| 2015/0060856 A1 | 3/2015 | Tyberg et al. | |
| 2015/0162448 A1 | 6/2015 | Raghavan et al. | |
| 2015/0162913 A1 | 6/2015 | Genoe et al. | |
| 2015/0249096 A1 | 9/2015 | Lupino et al. | |

* cited by examiner

POWER GATING AND CLOCK GATING IN WIRING LEVELS

BACKGROUND

Embodiments of the present disclosure relate generally to the field of semiconductor devices, and, more particularly, to power and clock gating within semiconductor devices.

Clock gating is a popular technique used in many synchronous circuits for reducing dynamic power dissipation. Clock gating saves power by adding more logic to a circuit to prune the clock tree. Pruning the clock disables portions of the circuitry so that the flip-flops or latches in them do not have to switch states. Switching states consumes power. When not being switched, the switching power consumption goes to zero, and only leakage currents are incurred. Power gating is another technique used in integrated circuit design to reduce power consumption, by shutting off the current to blocks of the circuit that are not in use. Clock gating and power gating can be applied to semiconductor devices.

SUMMARY

Embodiments of the present disclosure relate generally to the field of semiconductor devices, and, more particularly, to power and clock gating within semiconductor devices.

Aspects of the present disclosure include a semiconductor structure. In some embodiments the semiconductor can include a front end of line (FEOL) portion. The FEOL portion can include a first logical processing unit (LPU) and a second LPU. The first LPU can be configured to perform a first operation and the second LPU can be configured to perform a second operation that follows the first operation. The semiconductor can further include a back end of line (BEOL) portion. The BEOL portion can include a plurality of wiring levels, and can further include a thin film device integrated into a wiring level of the plurality of wiring levels. The thin film device can include a power gate and a clock gate that can be electrically connected to the first LPU by an enable wire. The BEOL portion can further include a power gate and a clock gate that can be integrated into one or more wiring levels of the plurality of wiring levels. The power gate and the clock gate can be electrically connected to the power grid and the clock net, respectively, by the enable wire. The enable wire can be further electrically connected to a latch of the second LPU. The semiconductor can further include a signal wire that can be electrically connected to the first LPU, and can also be electrically connected to the latch.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

These and other objects, features and advantages of the present invention may become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

Figure 1:
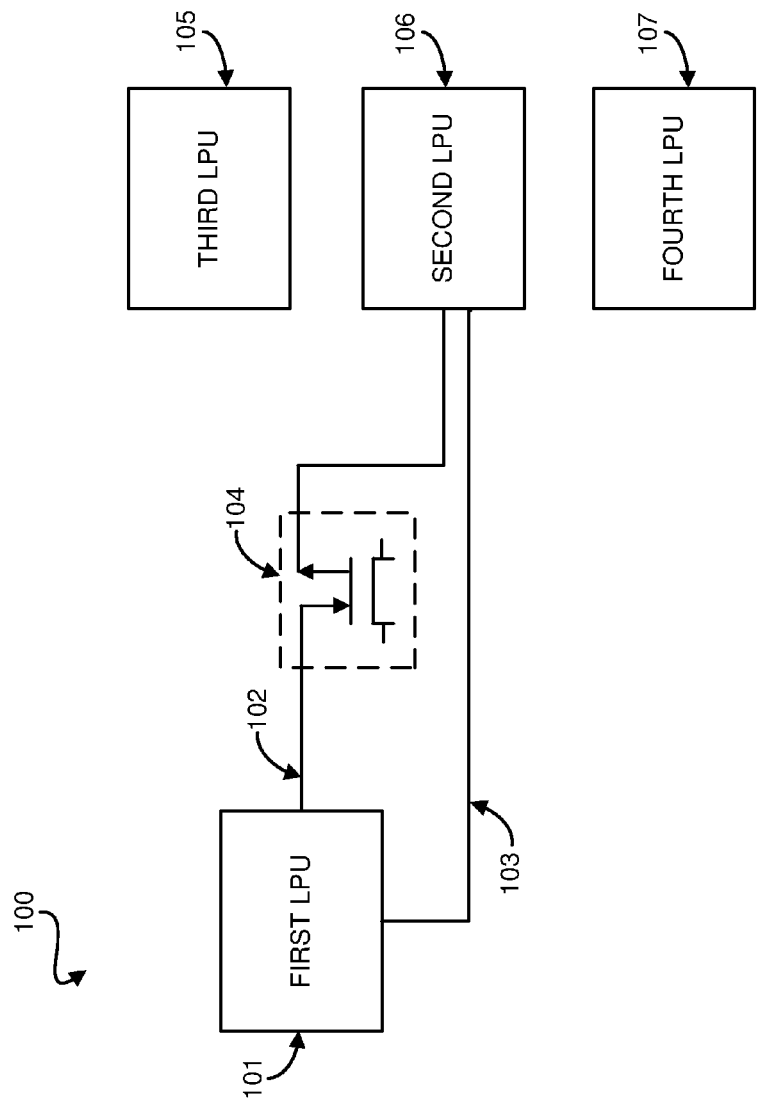
FIG. 1 illustrates a block diagram of an example first logical processing unit (LPU) activating a second LPU by transmitting an electrical signal via an enable wire and a signal wire, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present disclosure relate generally to the field of semiconductor devices, and, more particularly, to power and clock gating within semiconductor devices. The following described exemplary embodiments provide a structure to, among other things, decrease power dissipation within semiconductors devices. Therefore, the present embodiments have the capacity to improve the technical field of semiconductor devices by utilizing clock gates and power gates in a back end of line portion of a semiconductor. More specifically, the present embodiment may allow for more efficient use of back end of line (BEOL) portions of semiconductors, thereby reducing over crowdedness and power dissipation of electrical circuitry of front end of line (FEOL) portions in semiconductor devices.

As previously described, clock and power gates relate to gating power grids and clock nets associated with logical processing units that are not being utilized. Power grids and clock nets can be a large source of power consumption even when their associated logical processing unit is not being utilized. This power consumption is in part due to wire and via impedance of electrical circuitry of the associated logical processing unit. Aspects of the present disclosure can decrease power consumption by creating power gates and clock gates in the BEOL portion of a semiconductor, thereby turning off power to unused logical processing units, and further reducing distance travelled by electrical signals through vias, and still further decreasing overcrowding of electrical circuitry.

Semiconductor enhancements, particularly in the areas of lithography driven circuit density and enhancements in transistor performance have been mainstays in improving semiconductor performance and performance per unit of energy. Unfortunately, as geometries of available space within semiconductors shrink due to overcrowding of electrical circuitry, some structures, particularly wires, and via connections between wiring planes of the BEOL portion suffer increases in resistance that slows performance. Furthermore, both wire and via impedance increase as the diameter of wire and via decrease, therefore shrinking the diameter of the wire may not solve the overcrowding of circuitry.

Via impedance grows somewhat faster than wire impedance. Via resistance delays electrical signals traversing electrical vias between wiring levels. For example, when a clock net or a power grid are located in a different wiring level than a logical processing unit, electrical signals must travel from the different wiring levels. Via resistance is becoming the most significant impediment to enhancing frequencies on semiconductor products. Embodiments of the present disclosure addresses this issue by allowing logical operations, clock gates and power gates, to be performed in a wiring plane (BEOL portion) of a semiconductor device, at times eliminating the need to go through a via stack all the way down to the traditional semiconductor transistor level (FEOL portion) to complete logic, and then all the way back up through the via stack to advance across a die back up on the intended wiring plane. Embodiments of the present disclosure can demonstrate a technique to modulate clocks and/or power supply signals into a semiconductor functional unit while minimizing the area and performance implications of traditional signaling requiring the via stack addressed above.

Power and clock gating circuits are currently limited to large logical processing units (larger than one hundred to one thousand latches) because area in the FEOL portion of the semiconductor is crowded, and further because power and clock gate circuits are large. Therefore, power is not as gated as granularly as possible in logical processing units that are not being utilized. Aspects of the present disclosure addresses this concern by integrating power gates and clock gates in the BEOL portion of a semiconductor. As such, it may be advantageous, among other things, to implement power and clock gating techniques in the BEOL portion in order to reduce over crowdedness in the FEOL portion, and further reduce the amount of distance traveled by electrical signals, thereby decreasing via and wire impedance.

According to one embodiment, a semiconductor device can include a FEOL portion. The FEOL portion can include one or more logical processing units configured to perform operations on data, and can include electrical circuitry linking the one or more logical processing units. For example, a first logical processing unit can be configured to perform a first operation on data and the second logical processing unit can be configured to perform a second operation on the data following the first operation. The semiconductor device can further include a BEOL portion. The BEOL portion can include a plurality of wiring levels. The wiring levels can include electrical vias. Electrical vias can include logical units, electrical circuitry, and transistors integrated within them. A type of transistor, a thin film transistor, can be integrated into a wiring level of the plurality of wiring levels. The thin film transistor can comprise a power gate and/or a clock gate that can be electrically connected to the one or more of the logical processing units by an enable wire. The power gate and the clock gate can be electrically connected to a power grid and a clock net, respectively, by the enable wire. The enable wire can be further electrically connected to a latch or a flip flop of an associated logical processing unit. The semiconductor can further include a signal wire that can be electrically connected to a logical processing unit, and can also be electrically connected to the latch or flip flop.

Referring to FIG. 1, a block diagram 100 illustrating clock or power gating between a first logical processing unit (LPU) 101 and a second LPU 106 can be seen, according to various embodiments. In embodiments, the first LPU 101 and the second LPU 106 can be integrated into an FEOL portion of a semiconductor. The FEOL portion of the semiconductor can include one or more LPUs, e.g., the first LPU 101, the second LPU 106, a third LPU 105, and a fourth LPU 107. The second LPU 106, third LPU 105, and fourth LPU 107 can be physically small LPUs, e.g., less than one hundred latches, and therefore localized power and clock gating could be required. Currently, local power and clock gating in the FEOL portion would not be physically possible due to overcrowding of electrical circuitry. In some embodiments, implementing clock or power gates 104 in the form of transistors in the upper metal layers (BEOL portion) allow this local gating to occur. For simplicity, only one power or clock gate 104 has been depicted in this block diagram, but the third LPU 105 and the fourth LPU 107 could similarly include power and clock gating.

In some embodiments, the first LPU 101 could have performed a first operation on data. The data may be required to further undergo a second operation at the second LPU 106. The second LPU 106 could be gated off by either the clock or the power gate 104. The clock or power gate 104 could be implemented in order to reduce power dissipation of the electrical circuitry caused by wire and via impedance. In this case, the second LPU 106 is required to perform the second operation following a first operation performed by the first LPU 101, so its power grid and clock net need to be enabled. In this case, the third LPU 105 and the fourth LPU 107 are not needed to perform operations, thus their clock nets and power grids can be left off, saving power. In embodiments, the first LPU 101 can transmit an electrical signal via an enable wire 102 and a signal wire 103 once the first operation is completed. The enable wire 102 can activate the clock gate and/or the power gate 104. The activation of the clock gate and/or power gate 104 can induce an electrical signal to trigger a clock net and/or power grid, respectively, to be activated. The signal wire 103 can include the data to be processed by the second LPU 106.

Aspects of the present disclosure implement a technique to modulate clocks and/or power supply signals into a semiconductor device while minimizing the area consumed. This can be accomplished by having the power and clock gates integrated into the BEOL portion. Clock and power gates take up large areas, and therefore the distance between processing units that may perform sequential operations can be increased. This adding of power gates and clock gates to the BEOL portion could reduce the over crowdedness in the FEOL portion. The electrical circuitry of current semiconductor device deem power gating and clock gating smaller processing units (less than 100 latches) as inefficient, due to insufficient area in the FEOL portion for the gating to occupy. Implementing clock gates and power gates in the BEOL portion could increase the likelihood of smaller processing units (in the tens to hundreds and more latch count range) being gated without much penalty to area consumption. The ability to clock gate and/or power gate off the unused latches of associated processing units can increase by forty to eighty percent. Furthermore, this proposed gating does not affect the functioning units.

According to at least one embodiments, aspects of the present disclosure can utilize power and clock gates in the form of transistors in one or more wiring levels of the BEOL portion to trigger a power grid or clock net of an associated processing unit. Gating in the BEOL portion saves area in the FEOL portion. This can prevent layout issues in a semiconductor device with space and timing. In some embodiments, an enable wire can activate the power grid and the clock net. The enable wire, e.g. enable wire 102, can allow the power up of the power grid and the clock net to be activated in parallel with electrical signal propagation (incoming data). Some large width data buses of thirty bits, seventy bits, or more bits wide are inactive with no data switching for extended periods. The incoming data can be transmitted via a signal wire, e.g. signal wire 103. The power gate or clock gate 104, integrated into the BEOL, can allow the incoming data to trigger a switch up on the wiring planes; this transitions the state from a 0 to a 1 state or a 1 to a 0 state. Any one or more of the incoming bits of data can be sufficient to turn on the power gate or the clock gate, and start the power grid or clock net process. The incoming data in the form of an electrical signal can be latched and stored while the local logic enabling circuits, i.e. the power grid and clock net, are initialized.

Aspects of the present disclosure can demonstrate an approach to utilizing thin film field effect back end of line transistor devices to gate local clocks, bus powering circuits, global signals or other power saving initiatives. As another example, an approach to apply a set of incoming signals that can enable a local clock buffer (LCB) or driver can be closely examined. This LCB can be disabled to minimize power dissipation until the processing units served by this buffer are required. Normally, the LCB and processing units are powered whenever there is even a slight chance that any data will need to propagate. Aspects of the present disclosure can allow the continued clock and/or power gating of the processing unit until at least a bit of data is transmitted to a latch associated with the processing unit and stored. The structure of the semiconductor device is explained in further detail below with respect to FIG. 2 and FIG. 3.

Figure 2:
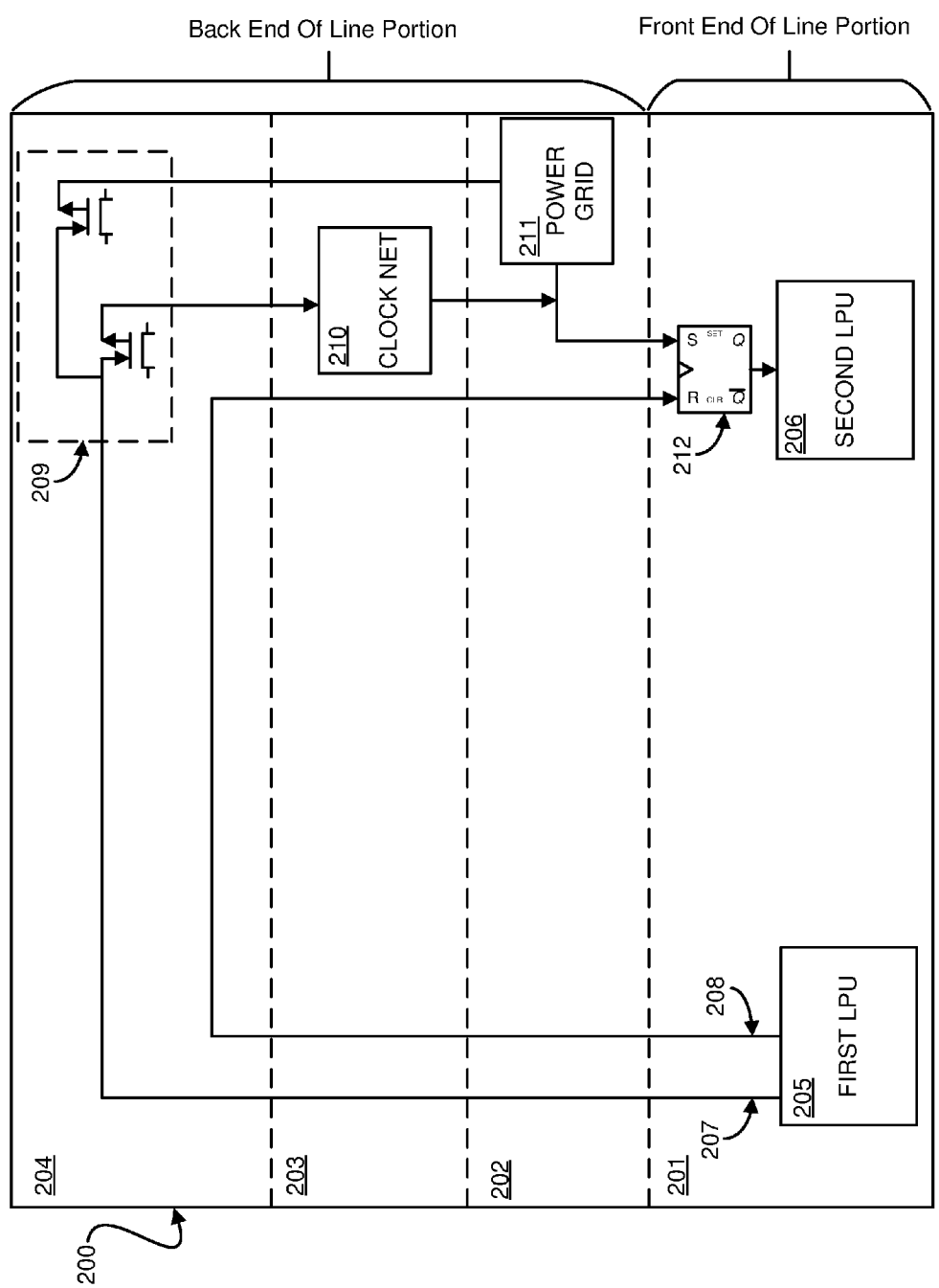
FIG. 2 illustrates an LPU activation block diagram of an example semiconductor that includes a clock gate and a power gate in a wiring level of a back end of line portion, in accordance with embodiments of the present disclosure.

Referring now to FIG. 2, an LPU activation block diagram of an example semiconductor 200 that includes a clock gate and a power gate 209 integrated into a third wiring level 204 can be seen, according to various embodiments. In some embodiments, the semiconductor 200 can comprise a BEOL portion that includes one or more wiring levels, i.e., a first wiring level 202, a second wiring level 203, and the third wiring level 204. The first wiring level 202 can include a power grid 211 associated with a second LPU 206. In some embodiments, the power grid 211 can be integrated into any one of the wiring levels, as well as integrated into an electrical via of the wiring levels. The second wiring level 203 can include a clock net 210 associated with the second LPU 206. In some embodiments, the clock net 210 can be integrated into any one of the wiring levels, as well as integrated into an electrical via of the wiring levels. The third wiring level 204 can include a power gate and a clock gate 209. The clock gate and the power gate 209 may be in the form of a thin film device, e.g., a thin film transistor. The thin film device can be comprised of a poly silicon material or other chemical compound. The clock gate can be associated with the clock net 210 and the power gate can be associated with the power grid 211.

The clock gate and the power gate 209 can each be in the form of a transistor, e.g., a field effect transistor (FET), metal-oxide-semiconductor field-effect transistor (MOSFET) transistor, bipolar junction transistor, etc. The clock gate and the power gate 209 can each include a different type of transistor. For example, the clock gate can be in the form of a first type of transistor, e.g. FET, and the power gate can be in the form of a second type of transistor, e.g. MOSFET. In some embodiments, the BEOL portion can include more than three wiring levels. In some embodiments, the power gate and the clock gate 209 can be integrated into different levels of the one or more wiring levels, e.g., the power gate can be integrated into a fourth wiring level (not shown) and the clock gate can be integrated into the third wiring level 204. In some embodiments, the power gate and the clock gate 209 can be integrated into one or more electrical vias of the one or more wiring levels. For example, a first electrical via that goes from a first wiring level to a second wiring level can include a power gate, and a second electrical via that goes from a second wiring level to a third wiring level can include a clock gate. An electrical via can include both the power gate and clock gate 209. In embodiments, the FEOL portion 201 can include one or more LPUs, i.e. a first LPU 205 and the second LPU 206.

The first LPU 205 can perform a first operation on data. The data may need to be processed by the second LPU 206. In embodiments, the first LPU 205 can transmit the data in the form of an electrical signal through a signal wire 208 to a latch 212 of the second LPU 206. The latch 212 can be an electrical circuit used to store information, e.g., a set-reset (SR) not AND (NAND) latch. The signal wire can exit through a top portion of the FEOL portion 201 and traverse through the first wiring level 202, the second wiring 203, and the third wiring level 204. The signal wire 208 can then traverse the third wiring level, then traverse back down the wiring levels until reaching the latch 212. In some embodiments, the signal wire 208 may not exit the FEOL portion 201 and may traverse the FEOL portion 201 until reaching the latch 212. In some embodiments, the signal wire 208 may not exit the first wiring level 202, and may traverse the first wiring level 202 until reaching the latch 212. In some embodiments, the signal wire 208 may not exit the second wiring level 203 and may traverse the second wiring level 203 until reaching the latch 212. The data can be stored in the latch 212 until the power grid 211 and the clock net 210 are activated. The power grid 211 and the clock net 210 of the second LPU 206 might have been turned off and need to be activated.

An electrical signal can be transmitted by the first LPU 205 via an enable wire 207 to the power gate and the clock gate 209. The enable wire 207 can exit, perpendicularly, through a top portion of the FEOL portion 201. The enable wire 207 can then proceed to traverse the first wiring level 202 and the second wiring level 203. The enable wire 207 can enter a bottom portion of the third wiring level 204 where it can electrically connect to the power gate and clock gate 209. The electrical signal can trigger the power gate and the clock gate 209 to activate the power grid 211 and the clock net 210, respectively. Once the power grid 211 and the clock net 210 are activated, the latch 212 can receive an electrical signal from the power grid 211 or the clock net 210. The latch 212 can then activate the second LPU 206 to perform the second operation on the data. In some cases, the power grid 211 may not need to be gated off, and therefore a clock gate may only be implemented into the BEOL portion.

Figure 3:
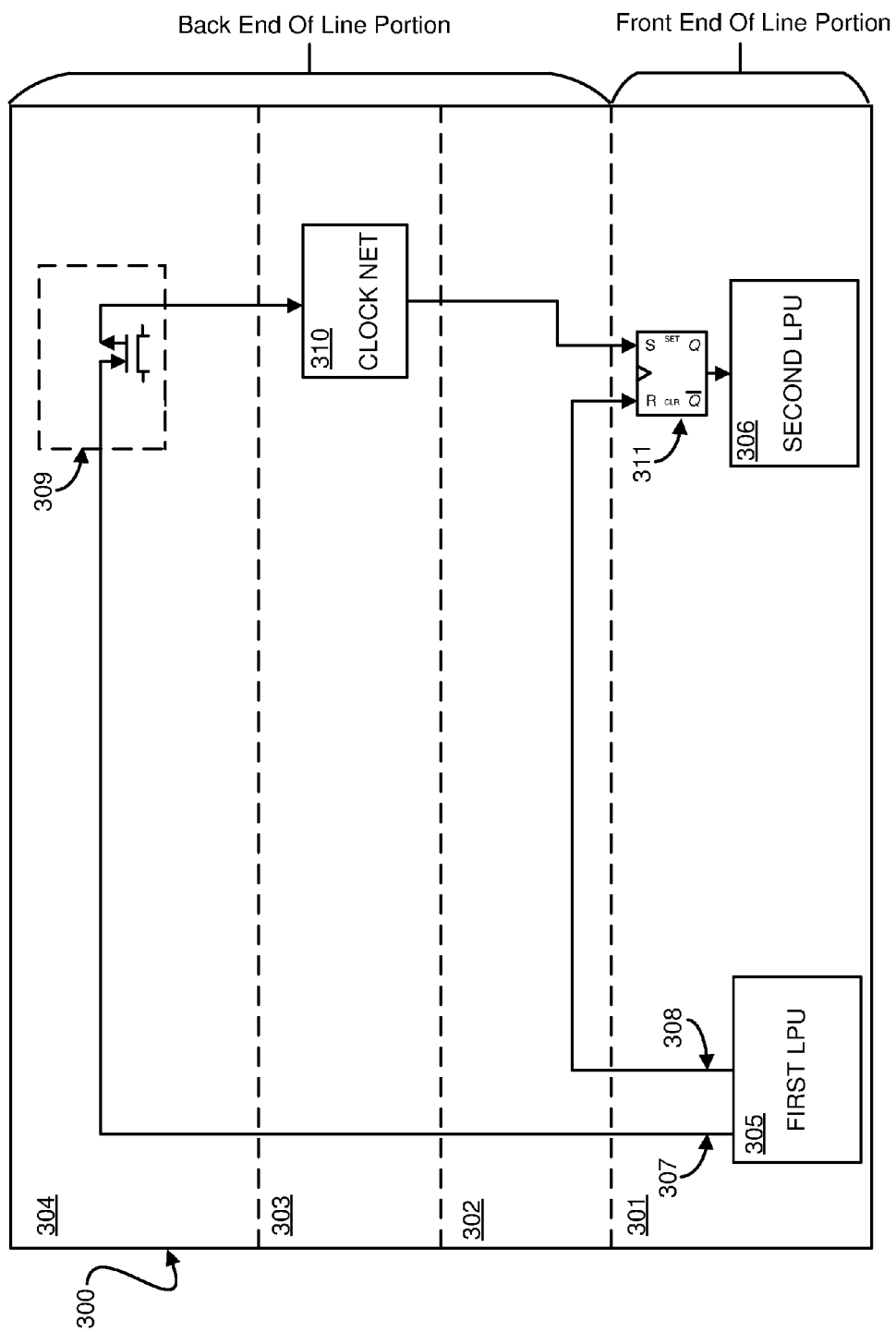
FIG. 3 illustrates a block diagram of an example semiconductor that includes a clock gate integrated in a third wiring level located above a clock net integrated into a second wiring level, in accordance with embodiments of the present disclosure.

Referring now to FIG. 3, a block diagram of an example semiconductor 300 that includes a clock gate 309 integrated into a third wiring level 304 can be seen, according to various embodiments. In some embodiments, the semiconductor 300 can include a BEOL portion that includes one or more wiring levels, i.e., a first wiring level 302, a second wiring level 303, and the third wiring level 304. The second wiring level 303 can include a clock net 310 associated with a second LPU 306 of the FEOL portion 301. The clock gate 309 may be in the form of a thin film device, e.g., a thin film transistor. The clock gate 309 can be associated with the clock net 310. The clock gate 309 can be in the form of a transistor, e.g., a field effect transistor (FET), MOSFET transistor, bipolar junction transistor, etc. In embodiments, the FEOL portion 301 can include one or more LPUs, i.e. a first LPU 305 and the second LPU 306.

The first LPU 305 can perform a first operation on data. The data might need to have a second operation performed upon it by the second LPU 306. In embodiments, the first LPU 305 can transmit the data in the form of an electrical signal through a signal wire 308 to a latch 311 of the second LPU 306. The signal wire 308 can exit through a top portion of the FEOL portion 301 and traverse through the first wiring level 302, then enter the FEOL portion 301 and continue traversing the FEOL portion 301 until reaching the latch 311. In some embodiments, the signal wire 308 can exit the top portion of the FEOL 301 and continue through the first wiring level 302, the second wiring level 303, and then third wiring level 304; the signal wire 308 can then traverse along the third wiring level 304, traverse back down the wiring levels until reaching the latch 311. In some embodiments, the signal wire 308 may not exit the FEOL portion 301 and may traverse the FEOL portion 301 until reaching the latch 311. In some embodiments, the signal wire 308 may not exit the second wiring level 303 and may traverse the second wiring level 303 until reaching the latch 311. The data can be stored in the latch 311 until the clock net 310 is activated.

An electrical signal can be transmitted by the first LPU 305 via an enable wire 307 to the clock gate 309. The enable wire 307 can exit through a top portion of the FEOL portion 301. The enable wire 307 can then proceed to traverse the first wiring level 302 and the second wiring level 303. The enable wire can then enter a bottom portion of the third wiring level 304 where it can electrically connect to the clock gate 309. The electrical signal can trigger the clock gate 309 to activate the clock net 310. Once the clock net 310 is activated, the latch 311 can receive an electrical signal from the clock net 310. The latch 311 can then activate the second LPU 306 to perform the second operation on the data. In some embodiments, the clock gate 309 can be located in a same wiring level as the clock net 310, e.g., the second wiring level 303 or the first wiring level 302. In some cases, the clock net 310 may not be gated off, and therefore a power gate may only be implemented into the BEOL portion.

Figure 4:
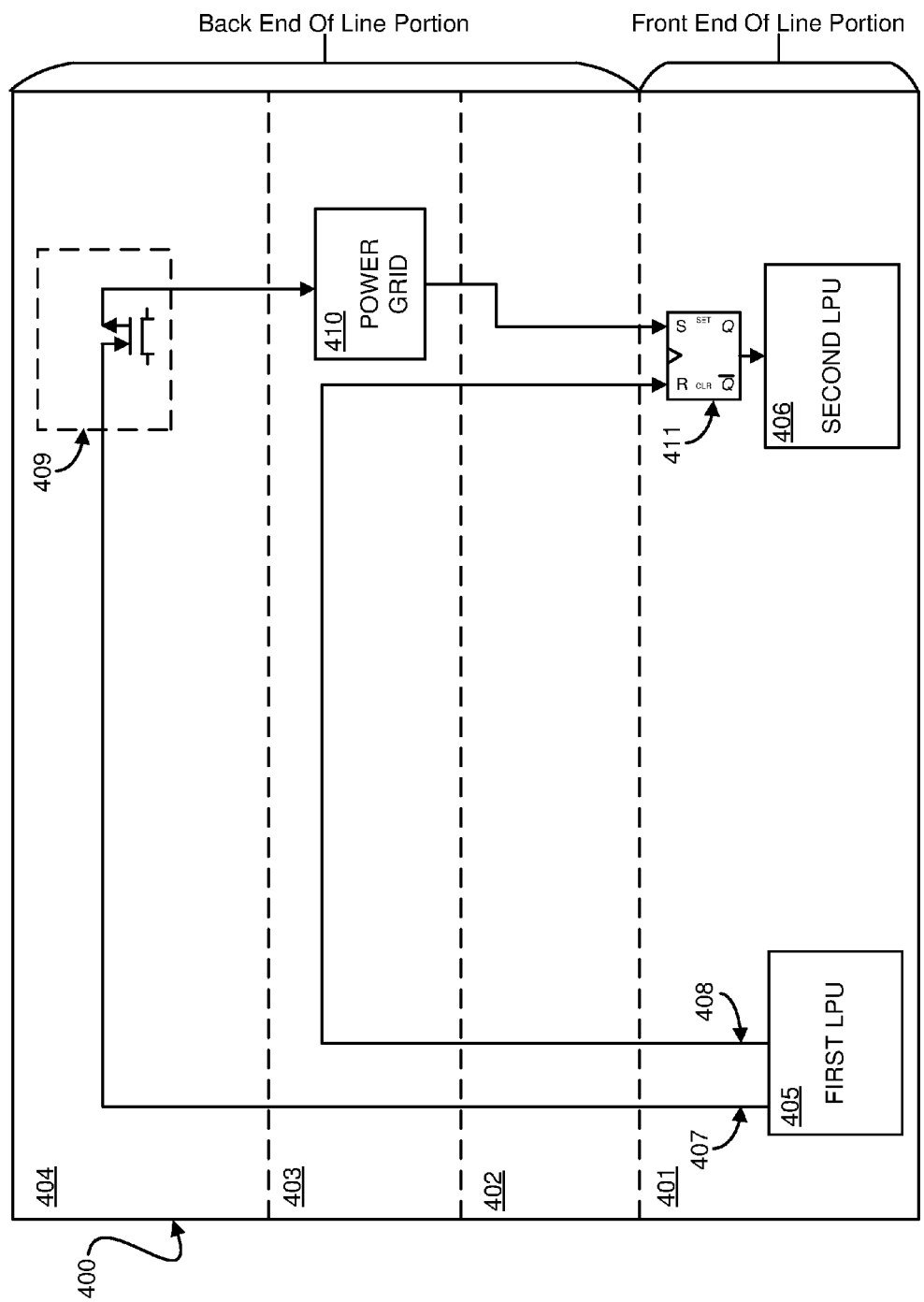
FIG. 4 illustrates a thin film device block diagram of an example semiconductor that includes a thin film device comprising a power gate integrated into a wiring level located above a power grid, in accordance with embodiments of the present disclosure.

Referring now to FIG. 4, a thin film device block diagram of an example semiconductor 400 that includes a power gate 409 integrated into a third wiring level 404 can be seen, according to various embodiments. In some embodiments, the semiconductor 400 can include a BEOL portion that includes one or more wiring levels, i.e., a first wiring level 402, a second wiring level 403, and the third wiring level 404. The second wiring level 403 can include a power grid 410 associated with a second LPU 406 of the FEOL portion 401. The third wiring level 404 can include a power gate 409. The power gate 409 may be in the form of a thin film device, e.g., a thin film transistor. The power gate 409 can be associated with the power grid 410. The power gate can be in the form of a transistor, e.g., a field effect transistor (FET), MOSFET transistor, bipolar junction transistor, etc. In embodiments, the FEOL portion 401 can include one or more LPUs, i.e. a first LPU 405 and the second LPU 406.

The first LPU 405 can perform a first operation on data. In embodiments, the first LPU 405 can transmit the data in the form of an electrical signal through a signal wire 408 to a latch 411 of the second LPU 406. The signal wire 408 can exit through a top portion of the FEOL portion 401 and traverse through the first wiring level 402, entering the second wiring level 403. The signal wire can then traverse the second wiring level 403, then enter the first wiring level 402, continuing through the FEOL portion 401 until reaching the latch 411. In some embodiments, the signal wire 408 can then exit the top portion of the FEOL portion 401 and continue through the second wiring level 403, and the third wiring level 404; the signal wire 408 can then traverse the third wiring level 404, traverse back down the wiring levels until reaching the latch 411. In some embodiments, the signal wire 408 may not exit the FEOL portion 401 and may traverse the FEOL portion 401 until reaching the latch 411. The data can be stored in the latch 411 until the power grid 410 is activated.

An electrical signal can be transmitted by the first LPU 405 via an enable wire 407 to the power gate 409. The enable wire 407 can exit through a top portion of the FEOL portion 401. The enable wire 407 can then proceed to traverse the first wiring level 402 and then the second wiring level 403. The enable wire can enter a bottom portion of the third wiring level 404 where it can electrically connect to the power gate 409. The electrical signal can trigger the power grid 410. Once the power grid 410 is activated, the latch 411 can receive an electrical signal from the power grid 410. The latch 411 can then activate the second LPU 406 to perform the second operation on the data. In some cases, the power grid 410 can be integrated into a same wiring level as a clock net.

Figure 5:
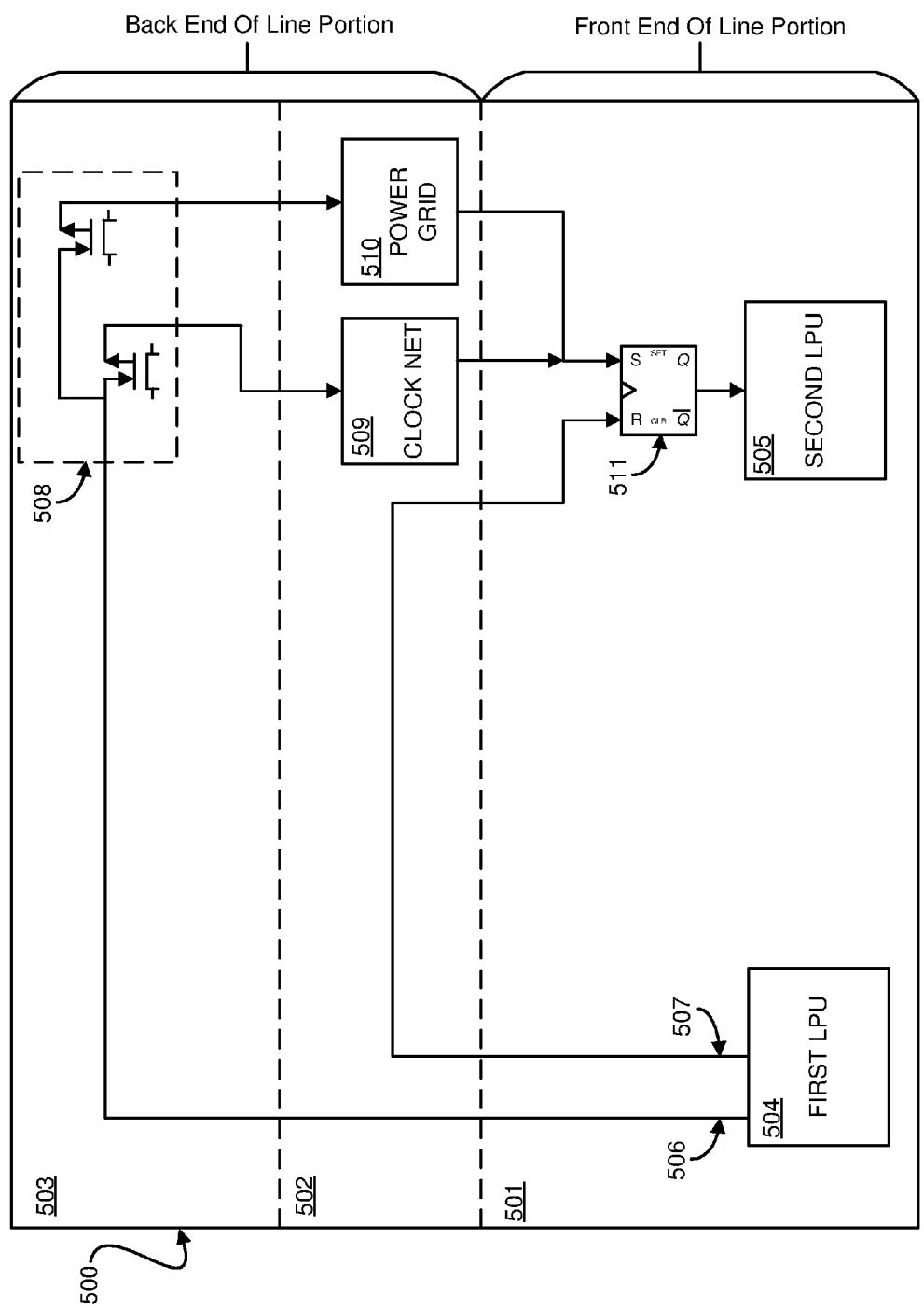
FIG. 5 illustrates a multilevel wiring block diagram of an example semiconductor that includes a thin film device located above a clock net and a power grid that are each integrated into a same wiring level, in accordance with embodiments of the present disclosure.

Referring now to FIG. 5, a multilevel wiring block diagram of an example semiconductor 500 that includes a clock gate and a power gate 508 integrated into a second wiring level 503 can be seen, according to various embodiments. In some embodiments, the semiconductor 500 can include a BEOL portion that includes one or more wiring levels, i.e., a first wiring level 502 and a second wiring level 503. The first wiring level 502 can include a clock net 509 and a power grid 510 that are associated with a second LPU 505. The second wiring level 503 can include a clock gate and a power gate 508. The clock gate and the power gate 508 may be in the form of a thin film device, e.g., a thin film transistor. The clock gate can be associated with the clock net 509 and the power gate can be associated with the power grid 510. The clock gate and the power gate 508 can each be in the form of a transistor, e.g., a field effect transistor (FET), MOSFET transistor, bipolar junction transistor, etc. In some embodiments, the clock gate can be in the form of a first type of transistor, e.g. FET, and the power gate can be in the form of a second type of transistor, e.g. MOSFET. In some embodiments, the BEOL portion can include more than two wiring levels or less than two wiring levels. In some embodiments, the clock gate and the power gate 508 can be integrated into different levels of the one or more wiring levels, e.g., the power gate can be integrated into a fourth wiring level and the clock gate can be integrated into a ninth wiring level. In embodiments, the FEOL portion 501 can include one or more LPUs, i.e. a first LPU 504 and the second LPU 505.

The first LPU 504 can perform a first operation on data. The data might need to be processed by the second LPU 505. In embodiments, the first LPU 504 can transmit the data in the form of an electrical signal through a signal wire 507 to a latch 511 of the second LPU 505. The signal wire 507 can exit through a top portion of the FEOL portion 501 and traverse through the first wiring level 502, then enter back into the FEOL portion 501, and continue within the FEOL portion 501 until reaching the latch 511. In some embodiments, the signal wire 507 may not exit the FEOL portion 501 and may traverse the FEOL portion 501 until reaching the latch 511. The data can be stored in the latch 511 until the power grid 510 and the clock net 509 are activated. Alternate embodiments can include the power grid 510, clock net 509, power gate and the clock gate 508 all on the same wiring level, e.g., the first wiring level 502, the second wiring level 503, a fifth wiring level, or an nth wiring level where n is any positive real number. Alternate embodiments can also include the power grid 510, clock net 509, power gate and the clock gate 508 all on different wiring levels, e.g., the clock net 509 can be integrated into the first wiring level 502, the power grid 510 can be integrated into the second wiring level 503, the clock gate can be integrated into a sixth wiring level, and the power gate can be integrated into a ninth wiring level.

An electrical signal can be transmitted by the first LPU 504 via an enable wire 506 to the power gate and the clock gate 508. The enable wire 506 can exit through a top portion of the FEOL portion 501. The enable wire 506 can then proceed to traverse the first wiring level 502, then enter the second wiring level 503 where it can electrically connect to the power gate and clock gate 508. The electrical signal can trigger the clock gate and the power gate 508 to activate the power grid 510 and the clock net 509, respectively. Once the power grid 510 and the clock net 509 are activated, the latch 511 can receive an electrical signal from the power grid 510 or the clock net 509. The latch 511 can then activate the second LPU 505 to perform the second operation on the data.

Similar embodiments as the approaches previously described and discussed in the previous figures can be implemented and useful using the techniques discussed herein when applied to single signal DC enable wires, security signals such as those indicating malicious code or environmental issues, and general power up or power down protocols. Anywhere this power gating and clock gating can mitigate a need to drive an electrical signal down through a via stack can be beneficial.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A semiconductor comprising:
   a front end of line portion that includes a first logical processing unit (LPU) and a second LPU, the first LPU designed to perform a first operation and the second LPU designed to perform a second operation following the first operation;
   a back end of line (BEOL) portion that includes a plurality of wiring levels, and further includes a power gate and a clock gate that are integrated into one or more wiring levels of the plurality of wiring levels, the power gate and the clock gate are further electrically connected to the first LPU by an enable wire, the power gate and the clock gate are electrically connected to a power grid and a clock net, respectively, by the enable wire, and the enable wire is further electrically connected to a latch of the second LPU; and
   a signal wire is electrically connected to the first LPU, and is also electrically connected to the latch.

2. The semiconductor of claim 1, wherein the power gate, clock gate, power grid, and clock net are integrated into a same wiring level of the one or more wiring levels.

3. The semiconductor of claim 1, wherein the latch is configured to activate the second LPU in response to receiving an electrical signal from both the enable wire and the signal wire.

4. The semiconductor of claim 1, wherein the power gate is integrated into an electrical via of the one or more wiring levels.

5. The semiconductor of claim 1, wherein the clock gate is integrated into an electrical via of the one or more wiring levels.

6. The semiconductor of claim 1, wherein the power grid is integrated into an electrical via of the one or more wiring levels.

7. The semiconductor of claim 1, wherein the clock net is integrated into an electrical via of the one or more wiring levels.

8. The semiconductor of claim 1, wherein the power gate is a thin film field effect transistor that is configured to transmit an electrical signal, in response to receiving an electrical signal exiting the clock net, that activates the power grid.

9. The semiconductor of claim 1, wherein the clock gate is a thin film field effect transistor that is configured to transmit an electrical signal, in response to receiving an electrical signal exiting the power grid, that activates the clock net.

10. The semiconductor of claim 1, wherein the one or more wiring levels that include the power gate and the clock gate are located vertically above the power grid and the clock net.

11. The semiconductor of claim 10, wherein the power gate and the clock gate are integrated into a same wiring level of the one or more wiring levels.

12. The semiconductor of claim 10, wherein the power gate and the clock gate are integrated into different wiring levels of the one or more wiring levels.

13. A semiconductor system comprising:
   a first logical processing unit (LPU) integrated in a front end of line portion transmitting an electrical signal, in response to a first operation being performed be the first LPU, via an enable wire to a power gate and a clock gate, the power gate and the clock gate are integrated into one or more wiring levels of a plurality of wiring levels of a back end of line (BEOL) portion;

the power gate and the clock gate activating a power grid and a clock net, respectively;

the enable wire transmitting an electrical signal to a latch of a second LPU once the power grid and the clock net are activated;

a signal wire transmitting an electrical signal, in response to the first operation being performed, to the latch; and the second LPU being activated to perform a second operation in response to the latch receiving the electrical signal from the signal wire and the enable wire.

14. The semiconductor system of claim 13, wherein the latch is configured to activate the second LPU in response to receiving an electrical signal from both the enable wire and the signal wire.

15. The semiconductor system of claim 13, wherein the power gate is a thin film field effect transistor that is configured to transmit an electrical signal, in response to receiving an electrical signal exiting the clock net, that activates the power grid.

16. The semiconductor system of claim 13, wherein the clock gate is a thin film field effect transistor that is configured to transmit an electrical signal, in response to receiving an electrical signal exiting the power grid, that activates the clock net.

17. The semiconductor system of claim 13, wherein the one or more wiring levels that include the power gate and the clock gate are located vertically above the power grid and the clock net.

18. The semiconductor system of claim 17, wherein the power gate and the clock gate are integrated into a same wiring level of the one or more wiring levels.

19. The semiconductor system of claim 17, wherein the power gate and the clock gate are integrated into different wiring levels of the one or more wiring levels.

\* \* \* \* \*